United States Patent
Tokumaru

(10) Patent No.: US 9,019,524 B2
(45) Date of Patent: Apr. 28, 2015

(54) IMAGE FORMING APPARATUS, IMAGE FORMING SYSTEM, METHOD OF CONTROLLING THE SAME, AND STORAGE MEDIUM

(71) Applicant: Canon Kabushiki Kaisha, Tokyo (JP)

(72) Inventor: Akiko Tokumaru, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 14/148,809

(22) Filed: Jan. 7, 2014

(65) Prior Publication Data

US 2014/0204407 A1    Jul. 24, 2014

(30) Foreign Application Priority Data

Jan. 18, 2013  (JP) .................... 2013-007842

(51) Int. Cl.
  G06K 15/00    (2006.01)
  G06F 15/00    (2006.01)
  G06F 3/12     (2006.01)
  H04N 1/60     (2006.01)
  H04N 1/00     (2006.01)

(52) U.S. Cl.
  CPC ........ *H04N 1/00891* (2013.01); *H04N 1/00896* (2013.01); *H04N 1/00885* (2013.01)

(58) Field of Classification Search
  None
  See application file for complete search history.

(56) References Cited

U.S. PATENT DOCUMENTS

| | | | |
|---|---|---|---|
| 6,314,476 B1 * | 11/2001 | Ohara ............................. 710/15 |
| 7,064,851 B1 * | 6/2006 | Silverbrook et al. ........ 358/1.15 |
| 7,076,673 B2 * | 7/2006 | Yoshikawa ..................... 713/300 |
| 7,292,363 B2 * | 11/2007 | Silverbrook et al. ........ 358/1.15 |
| 7,447,757 B2 * | 11/2008 | Muto ............................. 709/223 |
| 7,461,278 B2 * | 12/2008 | Togawa .......................... 713/320 |
| 8,717,621 B2 * | 5/2014 | Yamauchi ....................... 358/1.9 |
| 2002/0087635 A1 * | 7/2002 | Yamaguchi et al. .......... 709/205 |
| 2006/0079206 A1 * | 4/2006 | Kim ................................ 455/411 |
| 2006/0143706 A1 * | 6/2006 | Kawasaki et al. ................ 726/19 |
| 2006/0192997 A1 * | 8/2006 | Matsumoto et al. ......... 358/1.15 |
| 2010/0125742 A1 * | 5/2010 | Ohtani ........................... 713/310 |
| 2010/0250787 A1 * | 9/2010 | Miyata .............................. 710/9 |
| 2011/0078464 A1 * | 3/2011 | Yokomizo ..................... 713/300 |
| 2011/0299120 A1 * | 12/2011 | Sekine et al. ................. 358/1.15 |
| 2012/0236350 A1 * | 9/2012 | Otsuka .......................... 358/1.13 |
| 2013/0010326 A1 * | 1/2013 | Mochizuki ................... 358/1.15 |
| 2013/0057883 A1 * | 3/2013 | Ohshima et al. ............... 358/1.9 |
| 2014/0240739 A1 * | 8/2014 | Hattori .......................... 358/1.13 |

FOREIGN PATENT DOCUMENTS

JP        2000-165419 A      6/2000

* cited by examiner

*Primary Examiner* — Satwant Singh
(74) *Attorney, Agent, or Firm* — Rossi, Kimms & McDowell LLP

(57) ABSTRACT

An image forming apparatus and image forming system for communicating with a network via a server are disclosed. The server responds to an inquiry about device information of the image forming apparatus based on device information stored in a memory in a case that the server is in a power saving mode, and also updates device information in the memory upon receiving device information from the image forming apparatus. In addition, the server updates device information in the memory by requesting the image forming apparatus for the device information of the image forming apparatus in a case where the server shifts to the power saving mode. In a case that the device information of the image forming apparatus has changed, the image forming apparatus transmits the changed device information to the server.

8 Claims, 10 Drawing Sheets

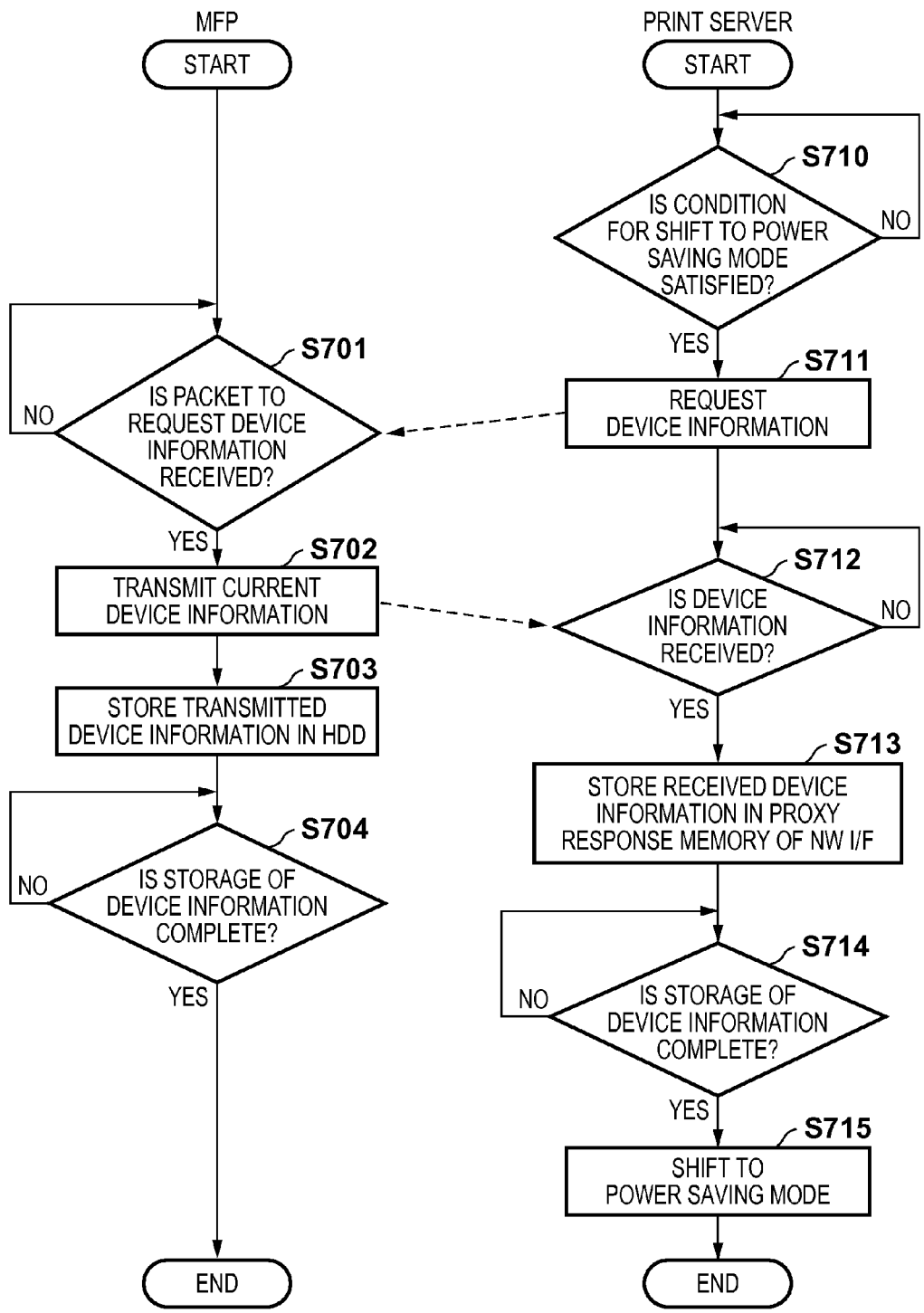

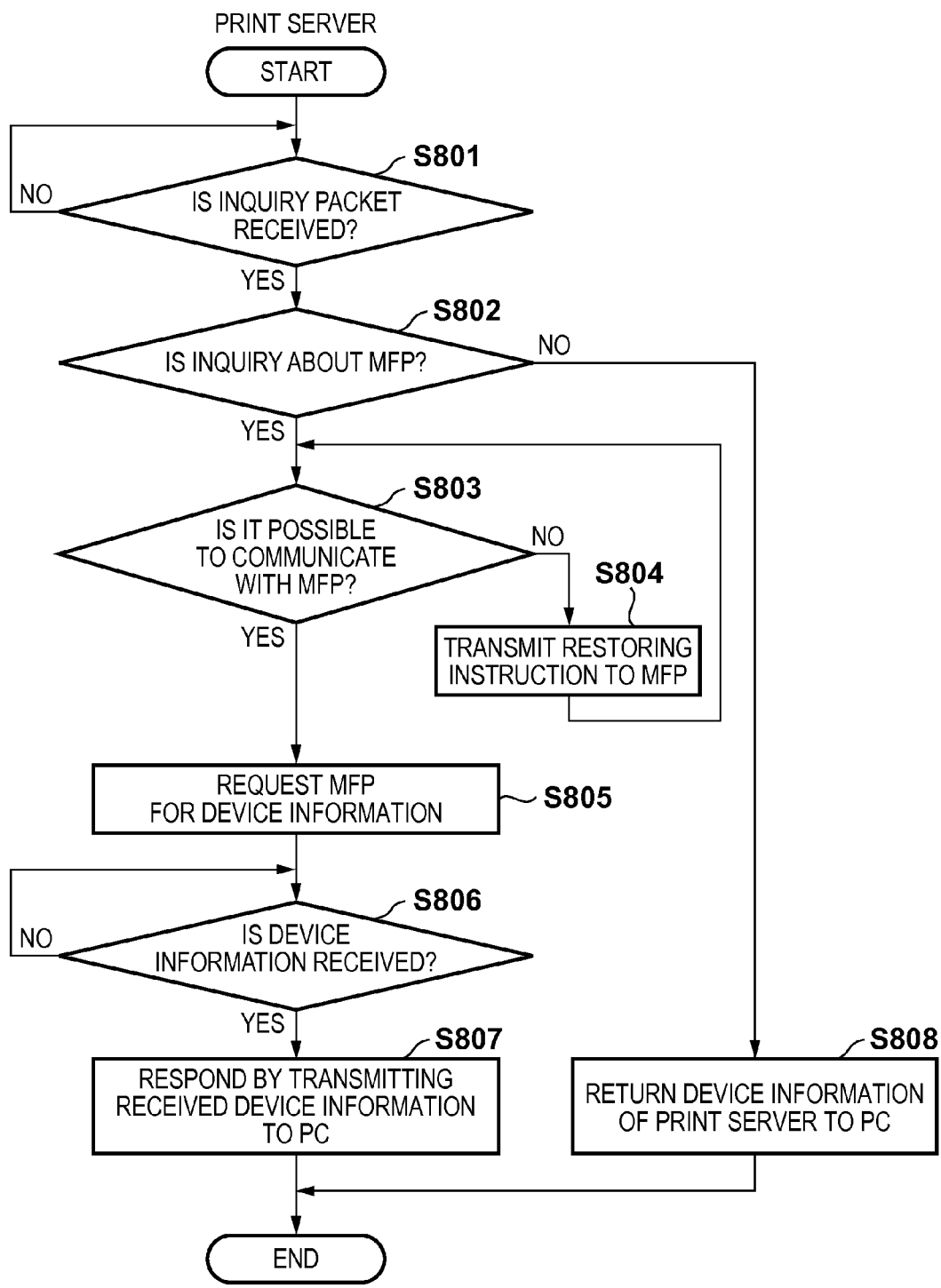

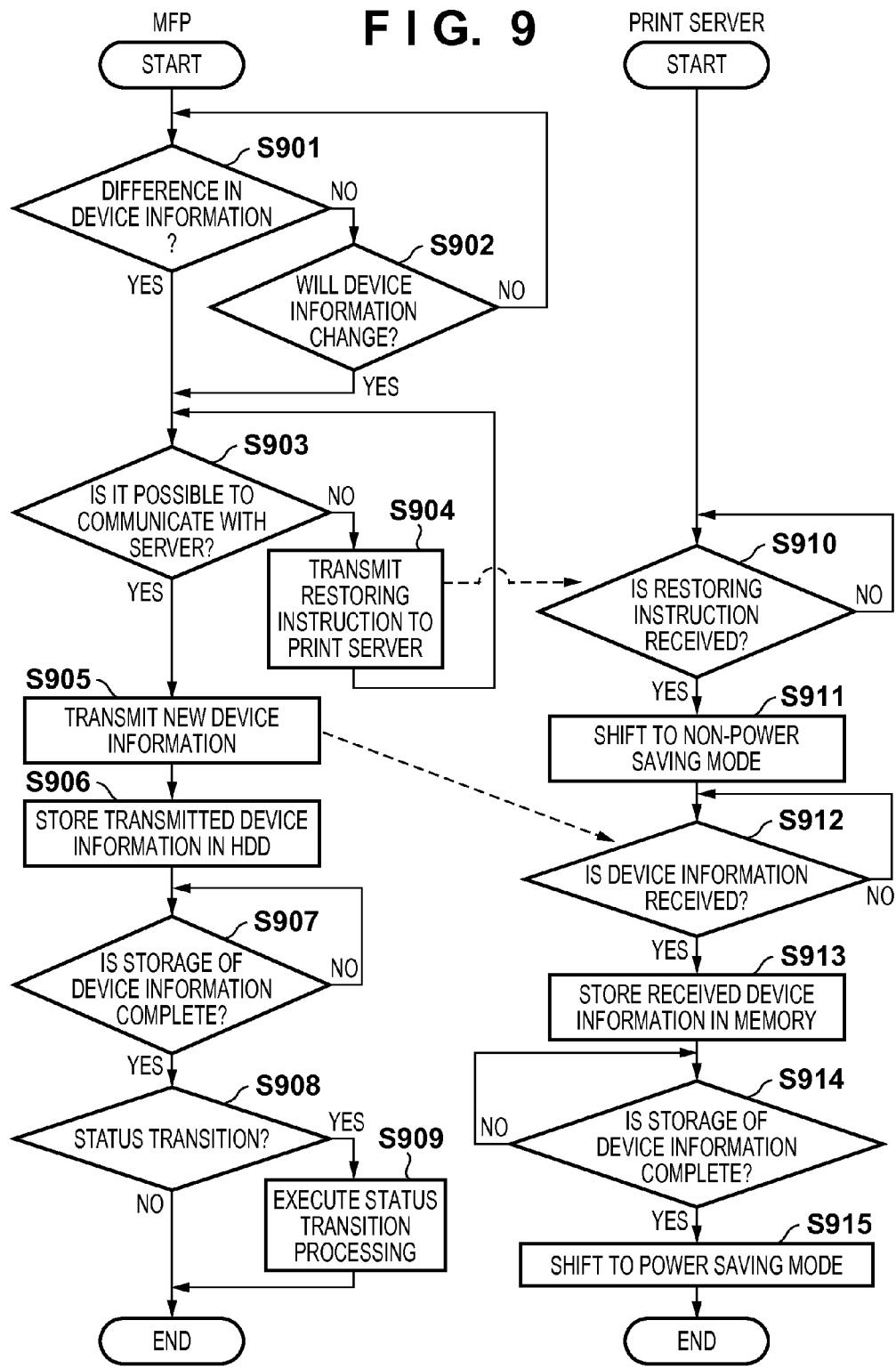

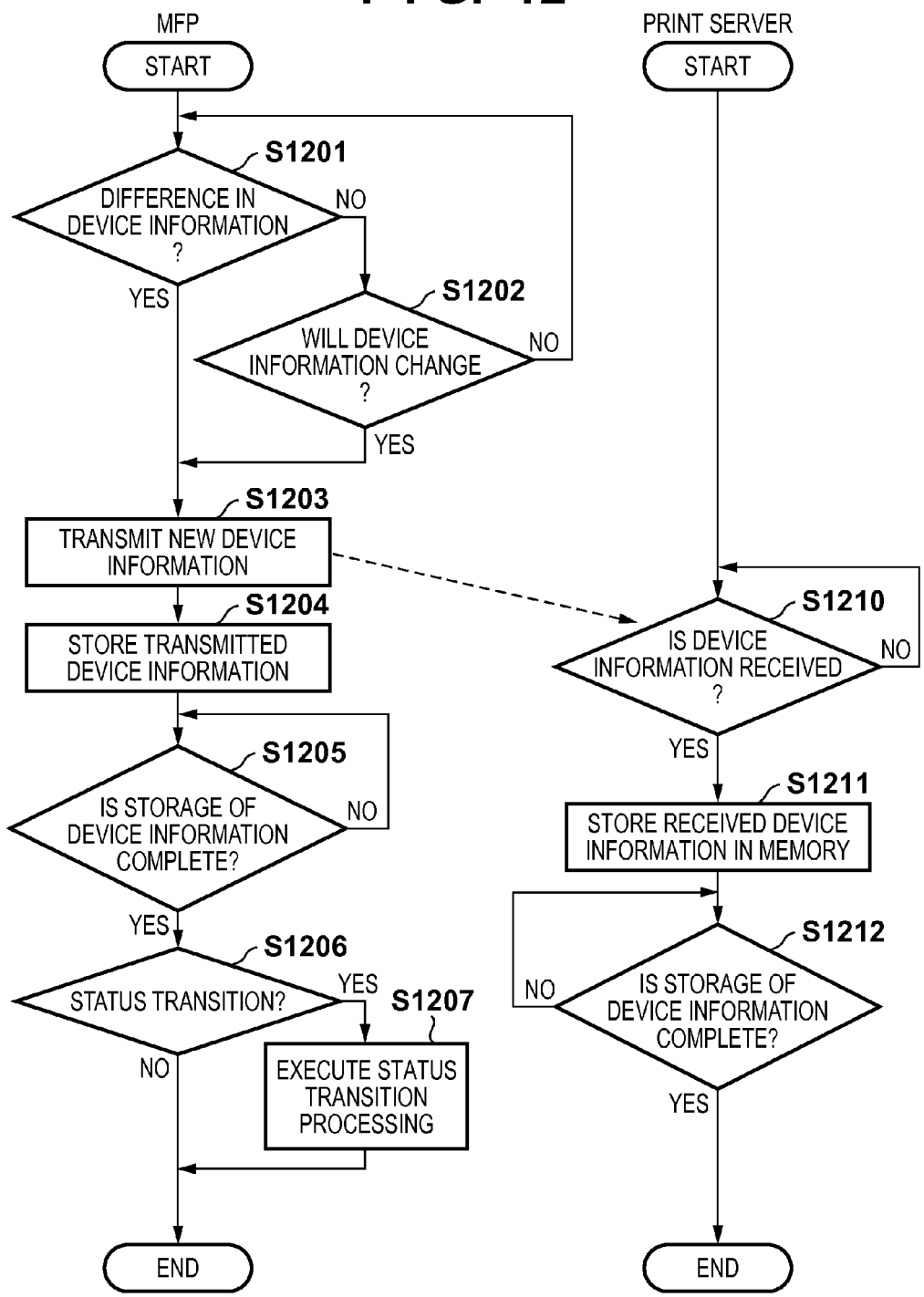

IMAGE FORMING APPARATUS, IMAGE FORMING SYSTEM, METHOD OF CONTROLLING THE SAME, AND STORAGE MEDIUM

BACKGROUND OF THE INVENTION

1. Field of the Invention

The present invention relates to an image forming apparatus, an image forming system including the image forming apparatus, a control method thereof, and storage medium.

2. Description of the Related Art

In recent years, with growing awareness of environmental issues, power saving has been promoted in image forming apparatuses such as printers and multi-function peripherals. One of the practical power saving methods is to control an image forming apparatus to shift it to a power saving mode when it is not used for a long time.

In this case, the power saving mode is one of a plurality of power modes of the image forming apparatus and a state in which the power consumption is smaller than that in a normal state. In this power saving mode, the image forming apparatus often achieves lower power consumption by stopping the supply of power to main control units excluding a RAM, NIC (Network Interface Card), and operation unit. The use of a proxy response function is conceivable in which, when the image forming apparatus receives a packet from a network in this power saving mode, responding to the packet with the NIC to which power is supplied. For example, Japanese Patent Laid-Open No. 2000-165419 discloses a technique of, while an image forming apparatus on a network is in the power saving mode, the NIC of another image forming apparatus in a non-power saving mode responds by proxy to an inquiry to the image forming apparatus in the power saving mode.

In the above conventional arrangement, the first image forming apparatus which performs proxy response is connected to the second image forming apparatus which requests the proxy response via a network. When the second image forming apparatus which has requested proxy response starts up to change its status, the apparatus responds by itself without proxy response.

A technique of connecting an image forming apparatus to a network via a print server is also conceivable. In this case, the print server which receives a packet addressed to the image forming apparatus from a PC or the like on the network performs proxy response for the image forming apparatus. In this case, after the print server shifts to the power saving mode, the image forming apparatus may singly start up to execute an offline job such as copying or scanning without the intervention of the print server. In such a case, the print server stays in the power saving mode unless a packet is received, and hence cannot communicate with the image forming apparatus. That is, the latest state of the image forming apparatus is not sent to the print server. This produces a difference between the current device state of the image forming apparatus connected to the print server and the device state of the image forming apparatus which is stored in the print server which performs proxy response.

SUMMARY OF THE INVENTION

An aspect of the present invention is to eliminate the above-mentioned problems which are found in the conventional technology.

A feature of the present invention is to provide a technique which is able to eliminate the difference between the device information of an image forming apparatus which is stored in a server which performs proxy response for the image forming apparatus and the actual device information of the image forming apparatus.

According to an aspect of the present invention, there is provided an image forming system including an image forming apparatus for communicating with a network via a server, wherein the server comprises: a proxy response unit configured to respond to an inquiry about device information of the image forming apparatus based on device information stored in a memory in a case that the server is in the power saving mode; and an updating unit configured to update device information in the memory upon receiving device information from the image forming apparatus, and update device information in the memory by requesting the image forming apparatus for the device information of the image forming apparatus in a case where the server shifts to the power saving mode, and wherein the image forming apparatus comprises: a transmission unit configured to transmit, in a case that the device information of the image forming apparatus has changed, the changed device information to the server; and a response unit configured to transmit the device information of the image forming apparatus to the server in response to the request for the device information from the updating unit.

According to an aspect of the present invention, there is provided an image forming apparatus for communicating with a network via a server, the apparatus comprising: a storage unit configured to store device information indicating a status of the image forming apparatus; an updating unit configured to update, in a case that the status of the image forming apparatus has changed, the device information in the storage unit with device information corresponding to the changed status, and transmit the updated device information to the server; and a transmission unit configured to transmit device information stored in the storage unit to the server in response to a request for device information from the server.

According to an aspect of the present invention, there is provided a method of controlling an image forming system including an image forming apparatus for communicating with a network via a server, the method comprising: a proxy response step of causing the server to respond to an inquiry about device information of the image forming apparatus based on device information stored in a memory in a case that the server is in a power saving mode; a step of causing the server to update device information in the memory upon receiving device information from the image forming apparatus; a step of causing the server to update device information in the memory by requesting the image forming apparatus for the device information of the image forming apparatus in a case where the server shifts to the power saving mode; a transmission step of causing the image forming apparatus to transmit, in a case that the device information of the image forming apparatus has changed, the changed device information to the server; and a response step of causing the image forming apparatus to transmit the device information of the image forming apparatus to the server in response to the request for the device information from the server.

According to an aspect of the present invention, there is provided a method of controlling an image forming apparatus for communicating with a network via a server, the method comprising: a storage step of storing device information indicating a status of the image forming apparatus in a memory; an updating step of updating, in a case that the status of the image forming apparatus has changed, the device information in the memory with device information corresponding to the changed status, and transmitting the updated device information to the server; and a transmission step of transmitting device information stored in the memory to the server in response to a request for device information from the server.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a flowchart for describing processing executed by each of the MFP and the printer server according to the first embodiment when the print server shifts to the power saving mode;

FIG. 8 is a flowchart for describing processing to be performed when the print server in the non-power saving mode according to the first embodiment has received an inquiry packet from a PC;

FIG. 9 is a flowchart for describing processing to be performed by the MFP and the print server in the power saving mode according to the first embodiment when the status of the MFP changes or has changed;

FIG. 12 is a flowchart for describing processing to be executed by the MFP and a print server in the power saving mode according to the second embodiment when the status of the MFP changes or has changed.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
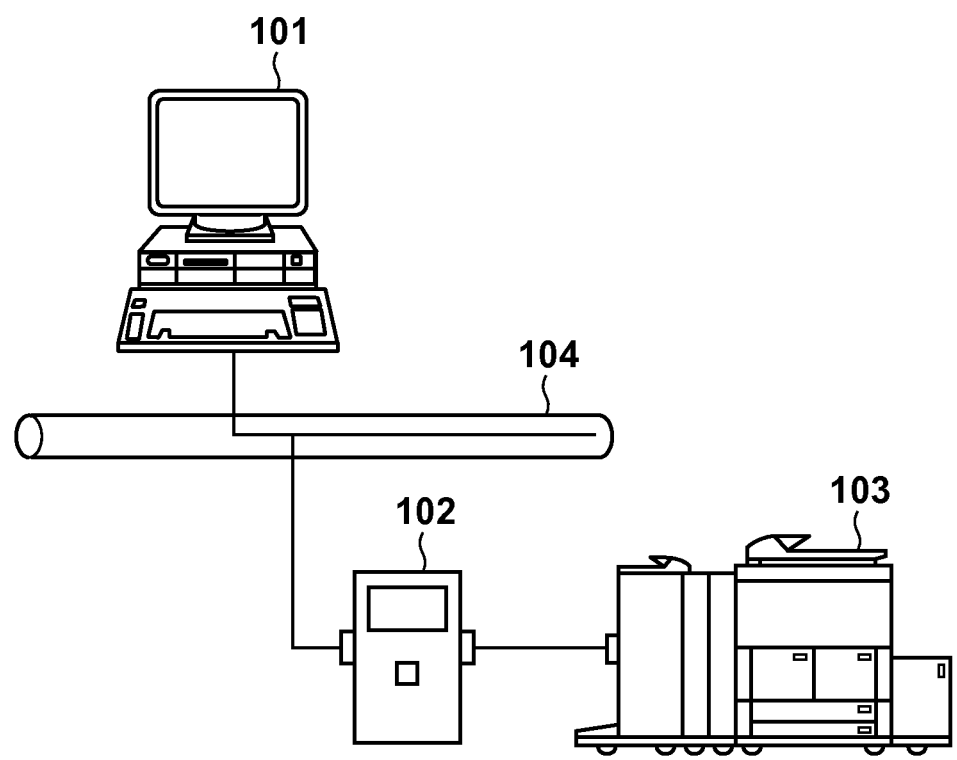
FIG. 1 depicts a view for explaining an image forming system according to the first embodiment of the present invention.

FIG. 1 depicts a view for explaining an image forming system according to the first embodiment of the present invention. Note that the constituent elements described in this embodiment are merely examples. The scope of the present invention is not limited to only them.

According to the connection form of this image forming system, a host computer (to be referred to as a PC) 101 is communicatively connected to a print server 102 dedicated to an image forming apparatus 103 (to be referred to as an MFP: multi-function peripheral hereinafter) via a network 104. The MFP 103 is not directly connected to the network 104, but is connected to it so as to communicate with the PC 101 of the network 104 via the print server 102.

The PC 101 can transmit, via the network 104, the image data of one or a plurality of pages to the print server 102 as a print instruction sent via a printer driver. In addition, the PC 101 periodically transmits packets to the print server 102 and the MFP 103 to inquire about device information (statuses). If the print server 102 is in the non-power saving mode, the print server 102 transmits its device information or the device information acquired from the MFP 103 in response to the received packet. In contrast, upon receiving an inquiry about the status of the MFP 103, the print server 102 in the power saving mode responds to the inquiry using the device information of the MFP 103 which is stored in the print server 102.

Figure 2:
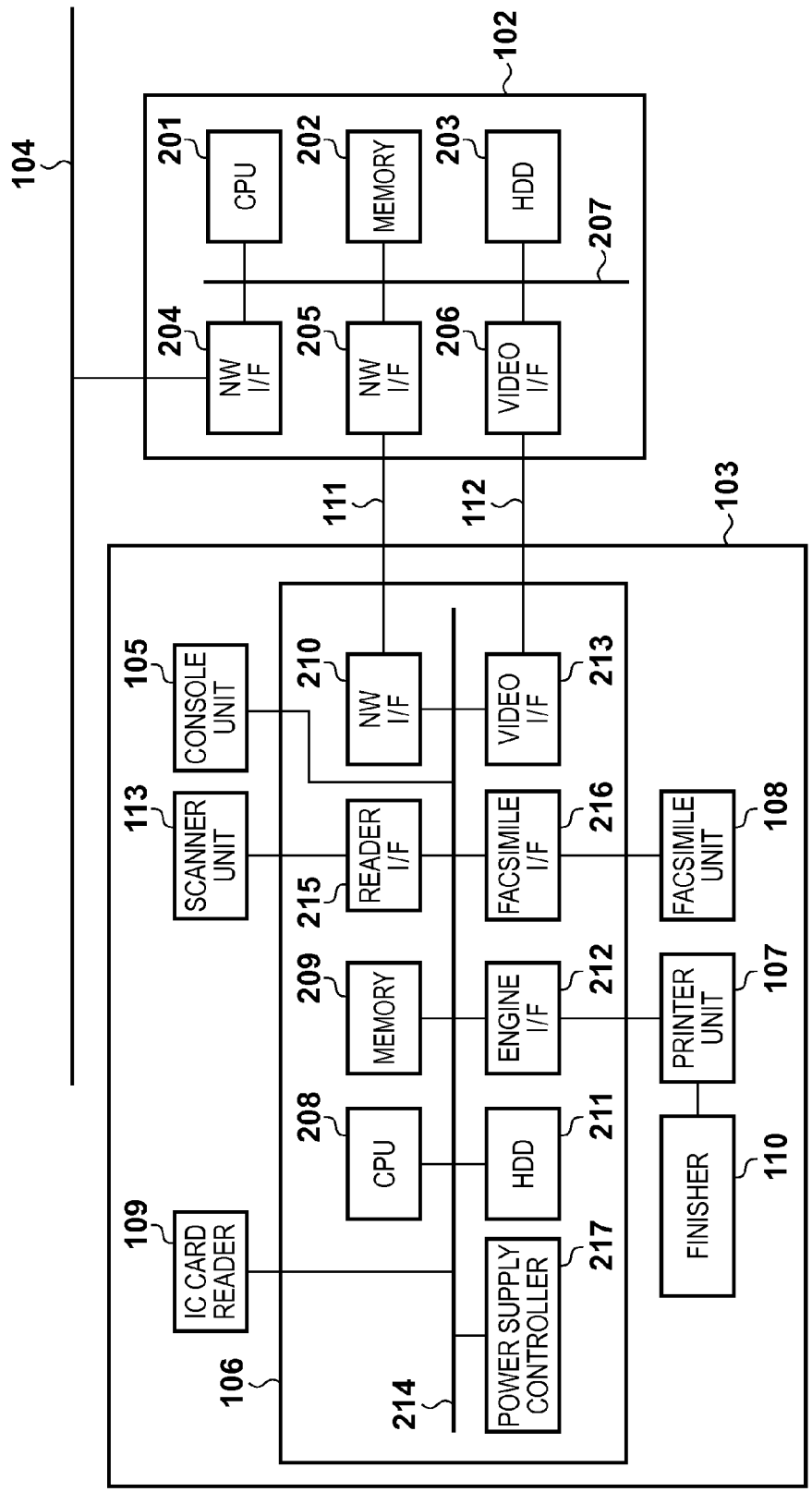
FIG. 2 is a block diagram for explaining the arrangement of an MFP and print server according to the first embodiment.

FIG. 2 is a block diagram for explaining the arrangement of the MFP 103 and print server 102 according to the first embodiment.

The MFP 103 includes a scanner unit 113, a console unit 105, an MFP controller 106, a printer unit 107, a facsimile unit 108, an IC card reader 109, and a finisher 110. The scanner unit 113 reads a document and inputs image data. The console unit 105 includes various types of keys and an operation panel. The console unit 105 accepts various types of instructions from the user via various types of keys. The console unit 105 displays various types of information on a display unit including a touch panel. The MFP controller 106 controls the scanner unit 113, the printer unit 107, and the like. The MFP controller 106 will be described in detail later.

The printer unit 107 prints on a sheet based on image data. The facsimile unit 108 is connected to a telephone line (not shown) and performs transmission/reception processing of facsimile signals via the telephone line or the like. The IC card reader 109 reads user information or the like from an IC card to identify the user. The finisher 110 receives sheets on which images are formed by the printer unit 107, and performs processes such as paper discharging, sorting, stapling, punching, and cutting for the received sheets.

The MFP 103 having this arrangement can execute the following functions.

Copy Function

This function stores, in an HDD 211, the image data acquired by making the scanner unit 113 read a document, and makes the printer unit 107 print on a sheet based on the image data.

SEND Function

This function transmits the image data obtained by making the scanner unit 113 read a document to the PC 101 via the network 104.

BOX Function

This function stores, in the HDD 211, the image data obtained by making the scanner unit 113 read a document, and also stores, in the HDD 211, the image data transmitted from the PC 101.

Print Function

This function receives the PDL (Page Description Language) data transmitted from the PC 101, and outputs print data to the printer unit 107 to print the print data.

The MFP controller 106 of the MFP 103 will be described in detail next with reference to FIG. 2.

The MFP controller 106 of the MFP 103 includes a CPU 208, a memory 209, a network interface (NW I/F) 210, the HDD 211, and an engine I/F 212. The MFP controller 106 further includes a video I/F 213, a reader I/F 215, a facsimile I/F 216, and a power supply controller 217. The CPU 208 performs control, computing operation, and the like of the respective units of the MFP 103 via a system bus 214 by executing programs stored in a storage device (the memory 209 and the HDD 211). The memory 209 is used as a program deploying area and a work memory for the CPU 208. The network I/F 210 transmits and receives control commands and various data to and from the print server 102 via a control cable 111. The HDD 211 is a large-capacity storage device and stores various types of control programs executed by the CPU 208 and image data. The engine I/F 212 transmits print data and control commands to the printer unit 107 and receives status data from the printer unit 107. The video I/F 213 transmits and receives image data to and from the print server 102 via a video cable 112. The reader I/F 215 transmits control commands to the scanner unit 113 and receives image data from the scanner unit 113. The facsimile I/F 216 is connected to the facsimile unit 108. The power supply controller 217 controls power supply to the respective units of the MFP 103.

The arrangement of the print server 102 will be described next.

The print server 102 includes a CPU 201, a memory 202, an HDD 203, network I/Fs 204 and 205, and a video I/F 206. The CPU 201 performs control, computing operation, and the like of the respective units of the print server 102 via a system bus 207 by executing programs stored in a storage device (the memory 202 and the HDD 203). The memory 202 is used as a program deploying area and a work memory for the CPU 201. The HDD 203 is a large-capacity storage device and stores various types of control programs executed by the CPU 201 and image data. The network I/F 204 communicates with other apparatuses such as the PC 101 via the network 104. The network I/F 205 transmits and receives control commands to and from the MFP 103 via the control cable 111. The video I/F 206 transmits and receives image data to and from the MFP 103 via the video cable 112.

The print server 102 has a function of rasterizing the print language data such as PDL data received from the PC 101 or the data compressed by JBIG or the like. The print server 102 can transmit rasterized image data to the MFP 103.

The print server 102 has a plurality of power modes depending on the power consumed. The print server 102 shifts to the power saving mode for reducing power consumption when no image data is received from the PC 101 for a predetermined time period or more. In this power saving mode, no clock for operation or no power is supplied to the CPU 201. It is also possible to further reduce power consumption by supplying no clock or no power to circuits other than a portion for saving necessary information such as the memory 202.

In this power saving mode, the network I/F 204 and the network I/F 205 are the only circuits which can operate as in the non-power saving mode. Although the network I/F 204 and the network I/F 205 can analyze packets received from the network 104 and properly respond even in the power saving mode, they cannot exchange information with the network or the MFP 103 because the CPU 201 cannot operate.

Figure 3:
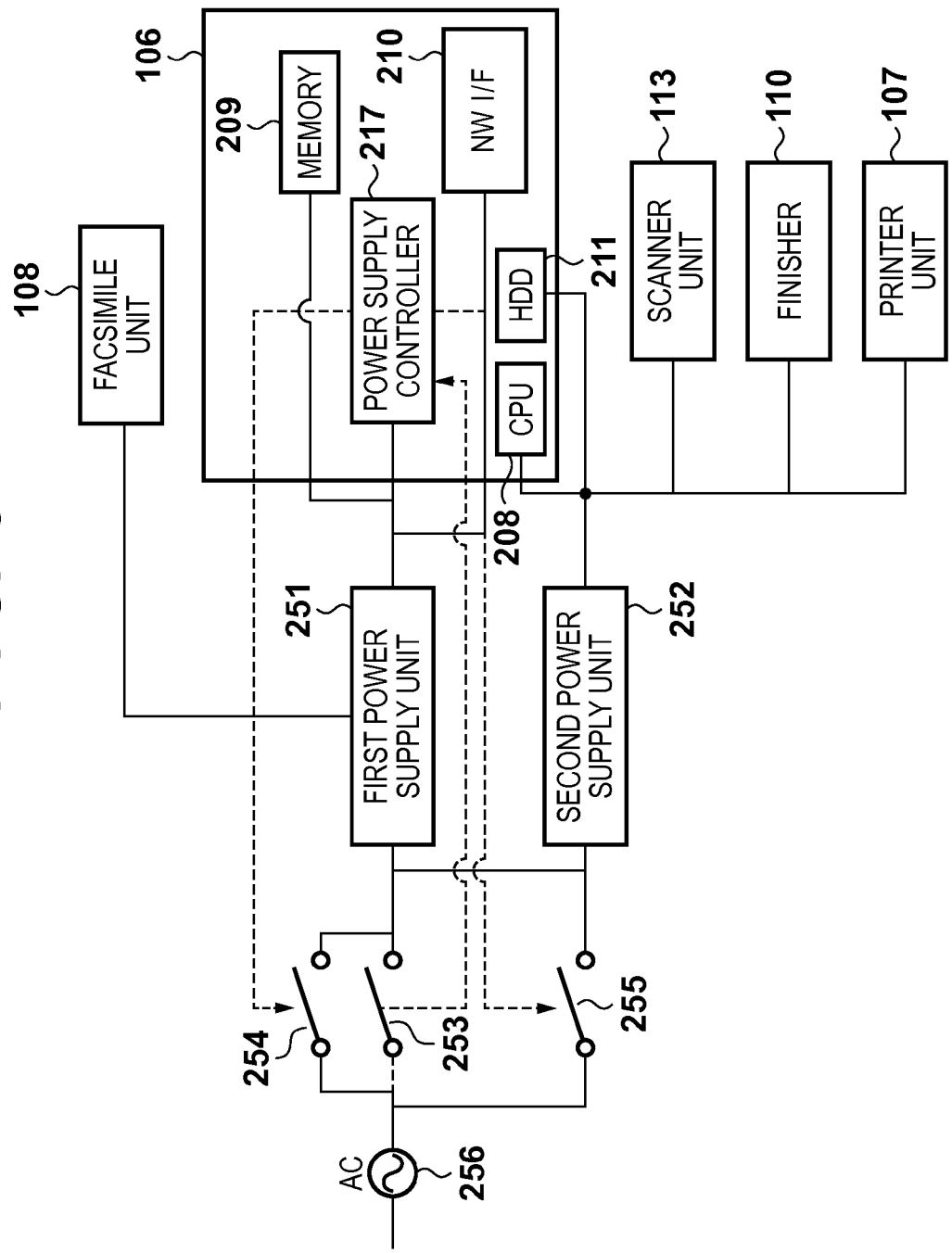
FIG. 3 is a block diagram for explaining the power supply circuit of the MFP according to the first embodiment.

FIG. 3 is a block diagram for explaining the power supply circuit of the MFP 103 according to the first embodiment. Note that the same reference numerals as in FIG. 2 denote the same units.

The MFP 103 includes a small-capacity first power supply unit 251 and a large-capacity second power supply unit 252. The first power supply unit 251 converts the AC power supplied from an AC power supply 256 into DC power (for example, 3.3 V). This DC power is supplied to the facsimile unit 108, the power supply controller 217, the memory 209, the network I/F 210, and the like. The second power supply unit 252 converts the AC power supplied from the AC power supply 256 into DC power (for example, 12 V or 24 V). This DC power is supplied to the printer unit 107, the scanner unit 113, the finisher 110, the CPU 208, the HDD 211, and the like. A seesaw switch 253 and a relay 254 are provided between the AC power supply 256 and the first power supply unit 251. A relay 255 is provided between the AC power supply 256 and the second power supply unit 252. The seesaw switch 253 is set in the ON or OFF state in accordance with the operation of the user. The state (OFF or ON state) of the seesaw switch 253 is notified to the power supply controller 217 (to be described later).

The power supply controller 217 detects the state (ON or OFF state) of the seesaw switch 253. The power supply controller 217 switches the relay 254 and the relay 255 on and off.

When the power supply controller 217 turns on the relay 254 and the relay 255, the first power supply unit 251 and the second power supply unit 252 supply power to the respective units such as the printer unit 107, the scanner unit 113, and the finisher 110. This sets the MFP 103 in the standby mode. In addition, the power supply controller 217 turns on the relay 254 and turns off the relay 255 to stop the supply of power from the second power supply unit 252 to the printer unit 107, the scanner unit 113, and the like. This sets the MFP 103 in the power saving mode. In this power saving mode, the MFP 103 supplies power to limited units such as the power supply controller 217, the memory 209, and the network I/F 210 but stops supplying power to the remaining units.

Note that the CPU 208 of the MFP controller 106 independently controls switching between the power saving mode and the non-power saving mode based on the condition preset in the MFP 103 regardless of the power mode of the print server 102.

Figure 4:
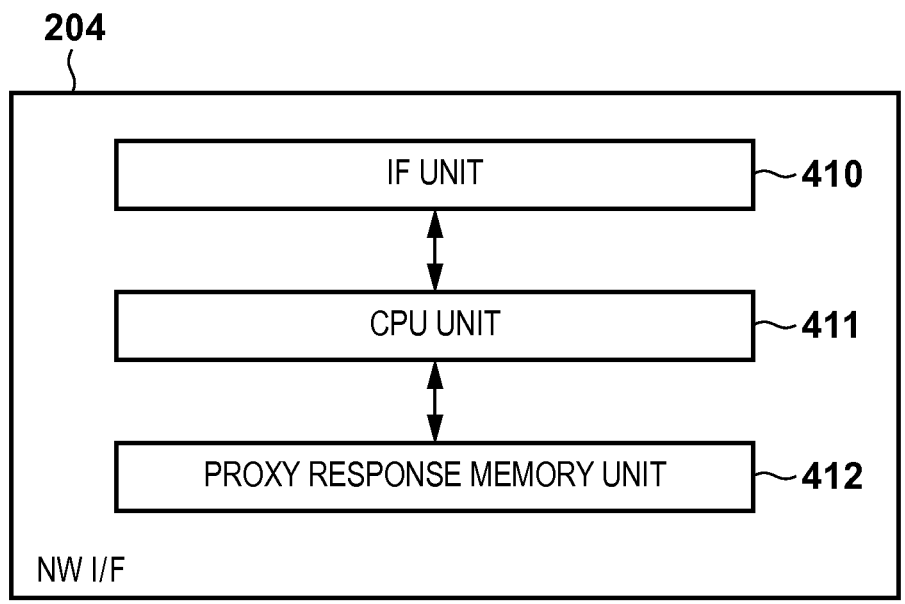
FIG. 4 is a block diagram for explaining the arrangement of the network interface (NW I/F) of the print server according to the first embodiment.

FIG. 4 is a block diagram for explaining the arrangement of the network interface (NW I/F) 204 of the print server 102 according to the first embodiment. The NW I/F 204 can operate even in the power saving mode because power is supplied to it in this mode.

The NW I/F 204 includes an IF unit 410 which transmits and receives data to and from the PC 101 and the like via the network 104, a CPU unit 411 which controls the operation of the NW I/F 204, and a proxy response memory unit 412 which stores device information to be referred to in the power saving mode. The NW I/F 204 starts proxy response in response to a notification from the CPU 201 when the print server 102 has shifted to the power saving mode. Even while the print server 102 is in the power saving mode, the print server 102 supplies power to the NW I/F 204. In the power saving mode, therefore, the CPU unit 411 performs a series of control operations, that is, analyzing the packet received by the IF unit 410, selecting relevant information from the device information stored in the proxy response memory unit 412, and causing the IF unit 410 to respond.

In the non-power saving mode, the print server 102 causes the NW I/F 204 to receive the image data sent from the PC 101 via the network 104. The print server 102 causes the NW I/F 204 to receive the packet sent from the PC 101 to inquire about device information via the network 104, and responds to the packet.

The print server 102 stores the device information of the print server 102 and the device information of the MFP 103 in the proxy response memory unit 412 of the NW I/F 204 in advance. Upon receiving an inquiry packet from the PC 101 via the network 104 in the power saving mode, the CPU unit 411 analyzes the packet by referring to the proxy response memory unit 412. That is, the CPU unit 411 analyzes the address of the received packet to determine whether the packet is addressed to the self-apparatus or the MFP 103. Upon determining as a result of this analysis that the packet is addressed to the self-apparatus, the CPU unit 411 selects the device information of the self-apparatus from the device information stored in the proxy response memory unit 412 and responds. In contrast, upon determining that the packet is addressed to the MFP 103, the CPU unit 411 selects the device information of the MFP 103 from the device information stored in the proxy response memory unit 412 and responds. In this case, the device information is information concerning the power mode, an error such as jam or paper out, and the like, and is information indicating the current state of the MFP 103.

Note that the CPU 201 independently controls switching between the power saving mode and the non-power saving mode in the print server 102 based on the condition preset in the print server 102 regardless of the power mode of the MFP 103.

Figure 5:
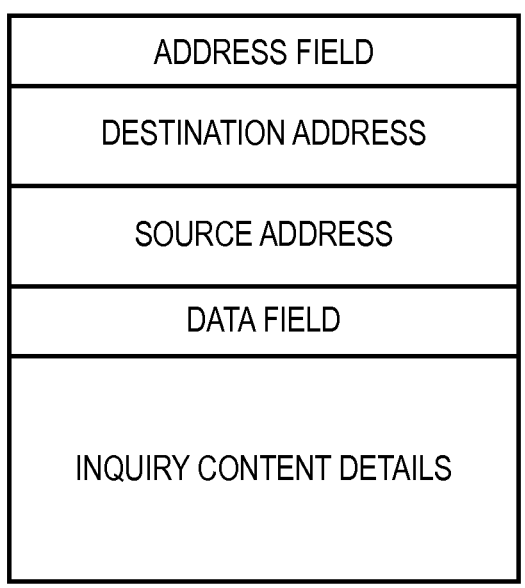
FIG. 5 depicts a view for explaining an example of the packet received by the print server according to the first embodiment via a network.

FIG. 5 depicts a view for explaining an example of the packet received by the print server 102 according to the first embodiment via the network 104.

This packet is constituted by an address field indicating an address and a data field indicating the details of an inquiry content other than the address. The CPU unit 411 of the NW I/F 204 analyzes a received packet by comparing the information in these fields of the packet.

For example, the CPU unit 411 analyzes a packet by comparing the address field of the packet to determine whether the packet is addressed to the print server 102 or the MFP 103. If the CPU unit 411 then compares the inquiry content of the data field with the information stored in the proxy response memory unit 412 in advance and determines that it is possible to respond by proxy to the inquiry, the CPU unit 411 can return a response to the network 104.

Note that FIG. 5 merely shows an example of the arrangement of a packet. This arrangement may include fields other than an address field and a data field. Alternatively, even if the field of a packet is not divided into an address field and a data field in this manner, it suffices if the packet has an arrangement including the address information of a destination and inquiry information.

Figure 6:
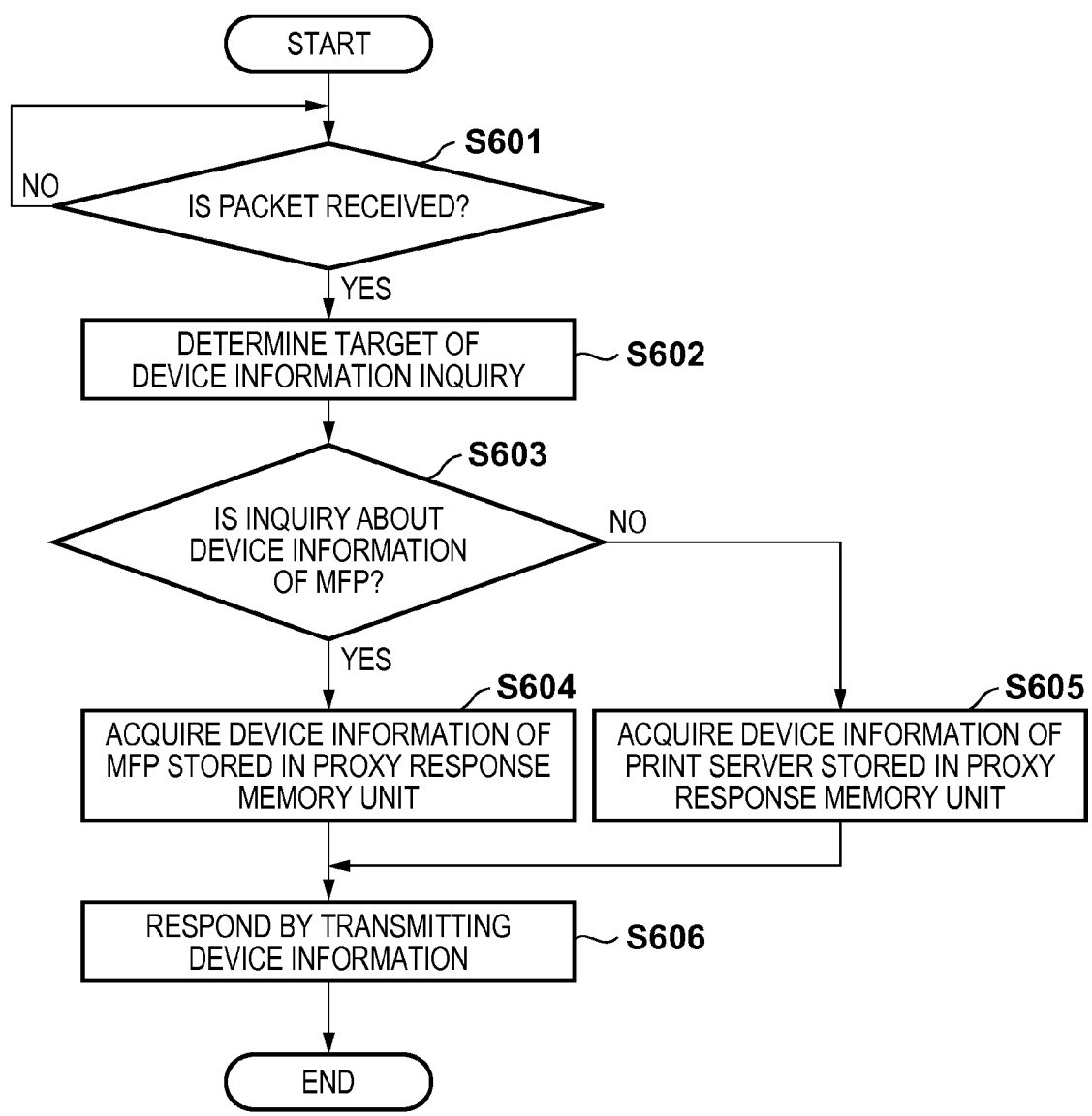
FIG. 6 is a flowchart for describing proxy response processing executed by the NW I/F when the print server according to the first embodiment is in the power saving mode.

FIG. 6 is a flowchart for describing proxy response processing executed by the NW I/F 204 when the print server 102 according to the first embodiment is in the power saving mode. The CPU unit 411 of the NW I/F 204 executes this processing.

In step S601, the CPU unit 411 waits for the reception of a packet to inquire about device information via the network 104. Upon receiving the inquiry packet, the process advances to step S602, in which the CPU unit 411 refers to the destination address of the packet to determine whether the packet is an inquiry packet for the device information of the print server 102 or MFP 103. If the CPU unit 411 determines in step S603 that the packet is an inquiry packet for the device information of the MFP 103, the process advances to step S604, in which the CPU unit 411 reads out the device information of the MFP 103 stored in the proxy response memory unit 412. The process then advances to step S606. If the CPU unit 411 determines in step S603 that the packet is an inquiry packet for the device information of the print server 102, the process advances to step S605, in which the CPU unit 411 reads out the device information of the print server 102 stored in the proxy response memory unit 412. The process then advances to step S606. In step S606, the CPU unit 411 responds by transmitting the readout device information to the source address of the packet.

FIG. 7 is a flowchart for describing processing executed by each of the MFP 103 and the printer server 102 according to the first embodiment when the print server 102 shifts to the power saving mode. Note that the CPU 208 implements processing in the MFP 103 by reading out and executing the program deployed in the memory 209. In addition, the CPU 201 implements processing in the print server 102 by reading out and executing the program deployed in the memory 202.

First of all, in step S710, the CPU 201 of the print server 102 determines whether a preset condition for shift to the power saving mode is satisfied. If the shift condition is satisfied, the process advances to step S711. If the shift condition is not satisfied, the CPU 201 keeps waiting in the non-power saving mode such as the standby mode. In step S711, the CPU 201 transmits a packet to request the device information of the MFP 103 to the MFP 103 before shift to the power saving mode. In this case, the device information of the MFP 103 is information concerning in particular the device state of the MFP 103 such as the remaining amount of paper of a paper feed cassette in the MFP 103, the remaining amount of toner, and the power mode of the MFP 103.

The CPU 208 of the MFP 103 waits for the reception of a packet to request device information from the print server 102. If the CPU 208 determines in step S701 that this packet is received, the process advances to step S702, in which the CPU 208 transmits the current device information of the MFP 103 to the print server 102.

With this operation, the CPU 201 of the print server 102 receives this device information in step S712. The process then advances to step S713, in which the CPU 201 stores the received device information in the proxy response memory unit 412 of the NW I/F 204. Together with this operation, the CPU 201 stores the device information of the print server 102 at this time point in the proxy response memory unit 412 in the NW I/F 204. With this operation, when the print server 102 receives a packet in the power saving mode, the CPU unit 411 of the NW I/F 204 can perform proxy response by analyzing the received packet by referring to the proxy response memory unit 412. The process then advances to step S714. If the CPU 201 determines that the device information of the MFP 103 has been stored in the proxy response memory unit 412, the process advances to step S715 to shift to the power saving mode.

After the CPU 208 of the MFP 103 transmits the device information of the MFP 103 to the print server 102 in step S702, the process advances to step S703 to store the device information transmitted in step S702 in the HDD 211. The process then advances to step S704. If the CPU 208 determines that the device information has been stored in the HDD 211, the MFP 103 stands by in the current status.

As described above, shifting to the power saving mode upon executing the processing described with reference to the flowchart of FIG. 7 allows the print server 102 to respond to a packet received in the power saving mode while remaining in the power saving mode. The print server 102 determines from the destination of a received packet whether the packet is addressed to the print server 102 or the MFP 103, and can respond to the packet by referring to relevant device information from the device information stored in the proxy response memory unit 412.

FIG. 8 is a flowchart for describing processing to be performed when the print server 102 in the non-power saving mode according to the first embodiment has received an inquiry packet from the PC 101. The CPU 201 implements this processing by executing the program deployed in the memory 202.

In step S801, the CPU 201 determines whether it has received an inquiry packet from the PC 101. If the CPU 201 determines that it has received a packet, the process advances to step S802. If the CPU 201 determines that it has received no packet, it keeps determining whether it has received a packet. In step S802, the CPU 201 compares the address field of the received packet to determine whether the inquiry packet is addressed to the print server 102 or MFP 103. If the CPU 201 determines in step S802 that the packet is addressed to the MFP 103, the process advances to step S803. If the CPU 201 determines in step S802 that the packet is addressed to the print server 102, the process advances to step S808.

In step S803, the CPU 201 determines whether or not it is possible to communicate with the MFP 103 via the NW I/F 205. As a technique of determining whether the CPU can communicate with the MFP, there is available, for example, a method of sending a packet via the network which connects the MFP 103 to the print server 102 and checking a network response to the packet. However, this determination technique can be any means which allows to determine whether or not the MFP 103 can communicate with the print server 102, and hence a detailed description of the technique will be omitted in this embodiment. If the CPU 201 determines in step S803 that it is possible to communicate with the MFP 103, the process advances to step S805. If the CPU 201 determines that it is not possible to communicate with the MFP 103, the process advances to step S804, in which the CPU 201 transmits a restoring instruction to the MFP 103. The process then returns to the step S803.

If the CPU 201 determines in step S803 that it can communicate with the MFP 103, the process advances to step S805, in which the CPU 201 requests the MFP 103 for the current device information. The process then advances to step S806, in which the CPU 201 determines whether it has received device information from the MFP 103 in response to the device information request. If the CPU 201 determines that it has received the device information, the process advances to step S807, in which the CPU 201 responds by transmitting the device information to the PC 101.

In contrast to this, if the CPU 201 determines in step S802 that the packet is not an inquiry packet addressed to the MFP 103, the process advances to step S808, in which the CPU 201 transmits the current device information of the print server 102 to the PC 101.

As described above, if the print server 102 is not in the power saving mode, it is possible to acquire the latest device information of the MFP 103 from the MFP 103 and respond.

FIG. 9 is a flowchart for describing processing to be performed by the MFP 103 and the print server 102 in the power saving mode according to the first embodiment when the status of the MFP 103 changes or has changed. Note that the CPU 208 implements processing in the MFP 103 by reading out and executing the program deployed in the memory 209. In addition, in the non-power saving mode, the CPU 201 implements processing in the print server 102 by reading out and executing the program deployed in the memory 202. In the power saving mode, the NW I/F 205 executes this processing.

In step S901, first of all, the CPU 208 of the MFP 103 determines whether the status indicated by the device information of the self-apparatus stored in the HDD 211 in step S703 in FIG. 7 differs from the current status of the self-apparatus. For example, such statuses differ from each other when the MFP 103 singly performs printing in, for example, the copy mode, and an error such as jam or paper out occurs. If the CPU 208 determines in step S901 that the statuses differ from each other, the process advances to step S903. In contrast to this, if the CPU 208 determines in step S901 that there is no difference in device information, the process advances to step S902, in which the CPU 208 determines whether the status of the MFP 103 will change. For example, the status of the MFP 103 which is currently set in the non-power saving mode such as the standby mode will change when it satisfies a preset condition for shift to the power saving mode and shifts to the power saving mode. If the CPU 208 determines in step S902 that the status will change, the process advances to step S903. If the CPU 208 determines in step S902 that the status will not change, the process returns to step S901 to keep monitoring whether the stored device information differs from the current status of the MFP 103.

In step S903, the CPU 208 determines whether or not it is possible to communicate with the print server 102. As a technique of determining whether the CPU 208 can communicate with the print server 102, there is available, for example, a method of sending a packet via the network which connects the MFP 103 to the print server 102 and checking whether a response to the packet is received. However, this determination technique can be any means which allows to determine whether the MFP 103 can communicate with the print server 102, and hence a detailed description of the technique will be omitted in this embodiment.

If the CPU 208 determines in step S903 that it is not possible to communicate with the print server 102, the process advances to step S904, in which the CPU 208 transmits a restoring instruction to the print server 102. The process then advances to step S903. In contrast to this, if the CPU 208 determines in step S903 that it is possible to communicate with the print server 102, the process advances to step S905. In step S905, the CPU 208 transmits the new device information of the MFP 103 to the print server 102. In this case, the MFP 103 may transmit only device information which needs to be rewritten or may transmit all device information. The object of this embodiment is to prevent the status of the MFP 103 from differing from the device information of the MFP 103 in the print server 102 which performs proxy response, and hence a detailed description of the method of updating information will be omitted in this embodiment. The process then advances to step S906, in which the CPU 208 stores the latest device information of the MFP 103, which has been transmitted in step S905, in the HDD 211. If the CPU 208 determines in step S907 that the processing of storing the device information transmitted in step S905 in the HDD 211 is complete, the process advances to step S908.

In step S908, the CPU 208 determines whether status transition processing is to be performed. If the CPU 208 determines that status transition processing is to be performed, the process shifts to step S909 to execute status transition processing such as the processing of shifting to the power saving mode.

Processing in the print server 102 will be described next.

First of all, in step S910, the NW I/F 205 determines whether or not it has received the restoring instruction transmitted from the MFP 103. If the NW I/F 205 determines that it has received the restoring instruction transmitted from the MFP 103, the process advances to step S911, in which the NW I/F 205 notifies the CPU 201 of an instruction to return from the power saving mode. With this operation, the CPU 201 receives the restoring instruction and performs control to make the print server 102 shift to the non-power saving mode.

When the print server 102 shifts to the non-power saving mode in this manner, the CPU 201 can communicate with the MFP 103.

In this manner, the process advances to step S912, in which the CPU 201 determines whether or not it has received device information from the MFP 103. If the CPU 201 determines that it has received the device information, the process advances to step S913 to overwrite the proxy response memory unit 412 of the NW I/F 204 with the received device information. The process then advances to step S914. If the CPU 201 determines in step S914 that the device information has been stored in the proxy response memory unit 412 of the NW I/F 204, the process advances to step S915, in which the CPU 201 shifts to the power saving mode again and terminates the processing.

As has been described above, according to the first embodiment, the print server 102 which performs proxy response can acquire and store the device information of the MFP 103 before shifting to the power saving mode.

If the status indicated by the stored device information of the MFP 103 differs from the current status of the MFP 103, the MFP 103 transmits the latest device information to the print server 102 and rewrites the device information stored in the print server 102. This rewriting operation is executed even if the print server 102 is in the power saving mode.

In this manner, the print server 102 always stores the latest status (device information) of the MFP 103. This can implement an image forming system which produces no difference between the actual device information of the MFP 103 and the device information of the MFP 103 which is stored in the print server 102 which performs proxy response.

In the future, there will be a system arrangement in which the MFP 103 is directly connected to the network 104. In this case, the MFP 103 can respond by transmitting its own status by itself. This arrangement is free from a status difference which poses a problem that the present invention is to solve.

In the image forming system in which the PC 101 is connected to the print server 102 via the network, and the MFP 103 is connected to the print server 102, when the PC 101 is to determine the status of the MFP 103, the PC 101 transmits a packet to request the check to the print server 102. At this time, if the print server 102 is in the power saving mode, no power is supplied to the NW I/F 205. Even if, therefore, the MFP 103 is directly connected to the network, the device information of the MFP 103 acquired by the PC 101 may differ from the actual device information of the MFP 103.

An image forming system in which the MFP 103 is directly connected to the network 104 will therefore be described as the second embodiment.

Second Embodiment

Figure 10A:
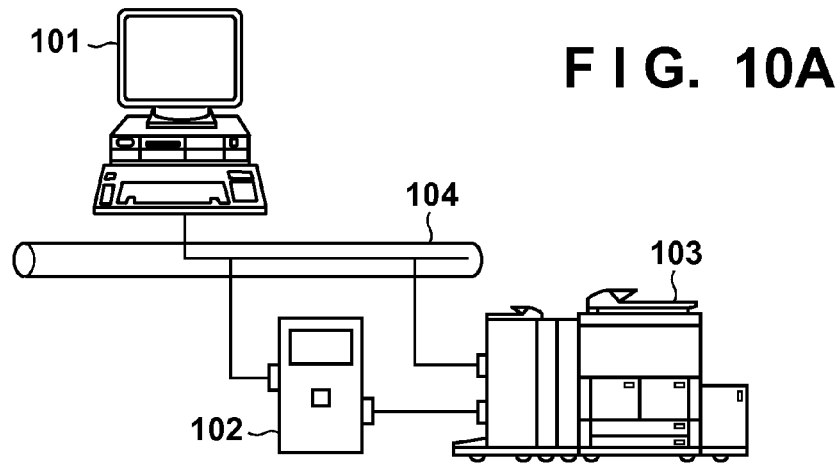
FIGS. 10A and 10B depict views for explaining an image forming system according to the second embodiment of the present invention.

FIG. 10A depicts a view for explaining an image forming system according to the second embodiment of the present invention. Note however that the constituent elements described in the second embodiment are merely examples. An important point of the second embodiment is that an MFP 103 which requests a print server 102 to perform proxy response is directly connected to a network 104. Therefore, this system may take a connection form like that shown in FIG. 10B or other connection forms, and the connection forms shown in these block diagrams are not intended to limit the scope of the present invention to only them.

In the case shown in FIG. 10A, the MFP 103 includes a network interface (not shown) for direct connection to the network 104 in addition to the arrangement shown in FIG. 2.

Figure 10B:
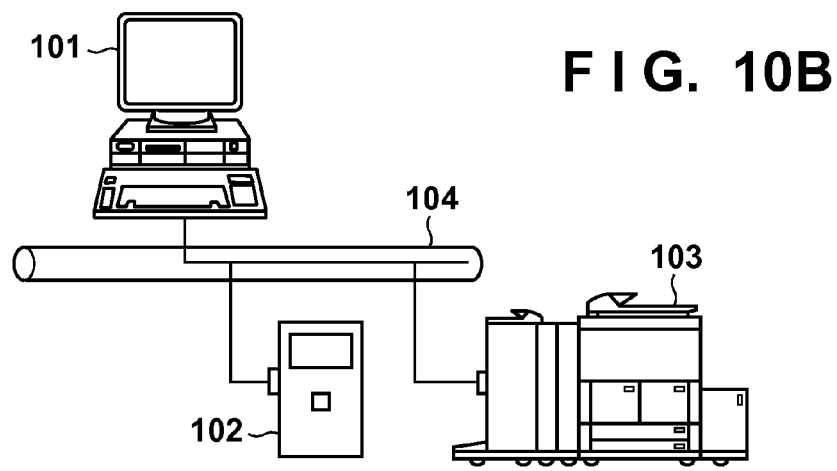

In the case shown in FIG. 10B, this system can be implemented by connecting an NW I/F 210 in FIG. 2 to the network 104.

In the image forming system according to the second embodiment, a PC 101, the print server 102, and the MFP 103 are communicatively connected to the network 104. This allows the MFP 103 to directly communicate with the devices on the network 104 via the above network interface (for example, the NW I/F 210 in the case shown in FIG. 10B) without the intervention of the print server 102.

In this image forming system, the PC 101 transmits a device information inquiry packet to the MFP 103. The MFP 103 then returns a proxy response from the NW I/F 210 to which power is supplied in the power saving mode.

Figure 11:
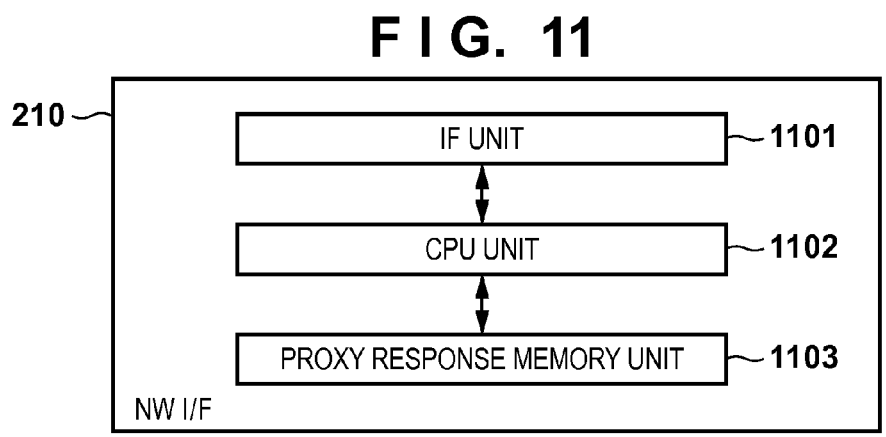
FIG. 11 is a block diagram for explaining the arrangement of an MFP and network interface (NW I/F) according to the second embodiment.

FIG. 11 is a block diagram for explaining the arrangement of the network interface (NW I/F) 210 of the MFP 103 according to the second embodiment. The NW I/F 210 can operate even in the power saving mode because power is supplied in the power saving mode. In this case, the NW I/F 210 is connected to only the network 104 and is not connected to the print server 102.

The NW I/F 210 includes an IF unit 1101 which transmits and receives data to and from a device on the network, a CPU unit 1102 which controls the operation of the NW I/F 210, and a proxy response memory unit 1103 which stores device information to be referred to in the power saving mode. When the MFP 103 has shifted to the power saving mode, the NW I/F 210 starts proxy response processing upon receiving a notification indicating the shift to the power saving mode from a CPU 208 of the MFP 103. Power is supplied to the NW I/F 210 even in the power saving mode. The CPU unit 1102 performs a series of control operations in the power saving mode, that is, analyzing the packet received by the IF unit 1101, selecting proper information from the device information stored in the proxy response memory unit 1103, and causing the IF unit 1101 to respond.

FIG. 12 is a flowchart for describing processing to be executed by the MFP 103 and the print server 102 in the power saving mode according to the second embodiment when the status of the MFP 103 changes or has changed. Note that the CPU 208 implements processing in the MFP 103 by reading out and executing the program deployed in a memory 209. A CPU 201 implements processing in the print server 102 by reading out and executing the program deployed in a memory 202.

In step S1201, the CPU 208 of the MFP 103 determines whether or not the status indicated by the device information of the self-apparatus stored in an HDD 211 in step S703 in FIG. 7 differs from the current status of the self-apparatus. For example, such statuses differ from each other when the MFP 103 singly performs printing in, for example, the copy mode, and an error such as jam or paper out occurs. If the CPU 208 determines in step S1201 that the statuses differ from each other, the process advances to step S1203. In contrast to this, if the CPU 208 determines in step S1201 that there is no difference in device information, the process advances to step S1202, in which the CPU 208 determines whether the status of the MFP 103 will change. For example, the status of the MFP 103 will change when it satisfies a preset condition for shift to the power saving mode and shifts to the power saving mode. If the CPU 208 determines in step S1202 that the status will change, the process advances to step S1203. If the CPU 208 determines in step S1202 that the status will not change, the process returns to step S1201 to keep monitoring statuses and a device information difference.

In step S1203, the CPU 208 transmits the new device information to the print server 102 via the above network interface (not shown) and the network 104. The process advances to step S1204, in which the CPU 208 stores by overwriting the device information transmitted in step S1203 in the same area in the HDD 211 as that in which the device information is stored in step S703. The proxy response memory unit 1103 of the NW I/F 210 stores the device information. If the CPU 208 determines in step S1205 that the storage of the transmitted device information is complete, the process advances to step S1206. In step S1206, the CPU 208 determines whether or not status transition processing is to be performed. If the CPU 208 determines in step S1206 that status transition processing is to be performed, the process advances to step S1207 to execute status transition processing such as processing of shifting to the power saving mode. The CPU 208 then terminates the processing.

Processing in the print server 102 in the power saving mode will be described next.

First of all, in step S1210, a CPU unit 411 of the NW I/F 204 determines whether or not it has received the device information transmitted from the MFP 103. If the CPU unit 411 determines that it has received the device information, the process advances to step S1211, in which the CPU unit 411 stores the received information in a proxy response memory unit 412 of the NW I/F 204 by overwriting. Note that since the CPU unit 411 of the NW I/F 204 to which power is supplied in the power saving mode performs this rewrite control, it is possible to perform rewriting without causing the CPU 201 and other blocks to shift to the non-power saving mode. If the CPU unit 411 determines in step S1212 that it has completed device information overwriting, the CPU unit 411 subsequently performs proxy response by using the overwritten device information.

As has been described above, according to the second embodiment, even if the MFP 103 is directly connected to the network 104, it is possible to implement a system which produces no difference between the status of the MFP 103 and the status stored in the print server 102.

Other Embodiment

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-007842, filed Jan. 18, 2013, which is hereby incorporated by reference herein in its entirety.

What is claimed is:

1. An image forming system including an image forming apparatus for communicating with a network via a server, wherein the server comprises:
a proxy response unit configured to respond to an inquiry about device information of the image forming apparatus based on device information stored in a memory in a case that the server is in the power saving mode; and
an updating unit configured to update device information in the memory upon receiving device information from the image forming apparatus, and update device information in the memory by requesting the image forming apparatus for the device information of the image forming apparatus in a case where the server shifts to the power saving mode, and
wherein the image forming apparatus comprises:
a transmission unit configured to transmit, in a case that the device information of the image forming apparatus has changed, the changed device information to the server; and
a response unit configured to transmit the device information of the image forming apparatus to the server in response to the request for the device information from the updating unit.

2. The system according to claim 1, wherein in a case that the server is in the power saving mode, the transmission unit transmits changed device information of the image forming apparatus after the server is set in a non-power saving mode upon transmission of an instruction to return from the power saving mode to the server.

3. The system according to claim 1, wherein upon receiving an inquiry about the device information of the image forming apparatus in the non-power saving mode, the server responds to the inquiry using the device information acquired from the image forming apparatus.

4. An image forming apparatus for communicating with a network via a server, the apparatus comprising:
a storage unit configured to store device information indicating a status of the image forming apparatus;
an updating unit configured to update, in a case that the status of the image forming apparatus has changed, the device information in the storage unit with device information corresponding to the changed status, and transmit the updated device information to the server; and
a transmission unit configured to transmit device information stored in the storage unit to the server in response to a request for device information from the server,
wherein the request for device information from the server is transmitted from the server in a case that the server shifts from a non-power saving mode to a power saving mode.

5. The image forming apparatus according to claim 4, wherein the request for device information from the server is transmitted from the server by receiving an inquiry about device information from the network in a case that the server is in the non-power saving mode.

6. A method of controlling an image forming system including an image forming apparatus for communicating with a network via a server, the method comprising:
causing the server to respond to an inquiry about device information of the image forming apparatus based on device information stored in a memory in a case that the server is in a power saving mode;
causing the server to update device information in the memory upon receiving device information from the image forming apparatus;
causing the server to update device information in the memory by requesting the image forming apparatus for the device information of the image forming apparatus in a case where the server shifts to the power saving mode;

causing the image forming apparatus to transmit, in a case that the device information of the image forming apparatus has changed, the changed device information to the server; and causing the image forming apparatus to transmit the device information of the image forming apparatus to the server in response to the request for the device information from the server.

7. A method of controlling an image forming apparatus for communicating with a network via a server, the method comprising:

storing device information indicating a status of the image forming apparatus in a memory;

updating, in a case that the status of the image forming apparatus has changed, the device information in the memory with device information corresponding to the changed status, and transmitting the updated device information to the server; and transmitting device information stored in the memory to the server in response to a request for device information from the server, wherein the request for device information from the server is transmitted from the server in a case that the server shifts from a non-power saving mode to a power saving mode.

8. A non-transitory computer readable storage medium storing a computer-executable program for causing a computer to execute a method of controlling an image forming apparatus for communicating with a network via a server, the method comprising:

storing device information indicating a status of the image forming apparatus in a memory;

updating, in a case that the status of the image forming apparatus has changed, the device information in the memory with device information corresponding to the changed status, and transmitting the updated device information to the server; and transmitting device information stored in the memory to the server in response to a request for device information from the server, wherein the request for device information from the server is transmitted from the server in a case that the server shifts from a non-power saving mode to a power saving mode.

* * * * *